US009465950B2

(12) United States Patent
Yan

(10) Patent No.: US 9,465,950 B2
(45) Date of Patent: Oct. 11, 2016

(54) METHODS, APPARATUSES, AND COMPUTER-READABLE STORAGE MEDIA FOR SECURELY ACCESSING SOCIAL NETWORKING DATA

(75) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 14/373,592

(22) PCT Filed: Mar. 6, 2012

(86) PCT No.: PCT/CN2012/071982
§ 371 (c)(1),
(2), (4) Date: Jul. 21, 2014

(87) PCT Pub. No.: WO2013/131244
PCT Pub. Date: Sep. 12, 2013

(65) Prior Publication Data
US 2015/0013018 A1    Jan. 8, 2015

(51) Int. Cl.
| H04L 9/16 | (2006.01) |
| G06F 21/62 | (2013.01) |
| H04L 9/08 | (2006.01) |
| H04W 12/08 | (2009.01) |
| H04L 29/06 | (2006.01) |

(52) U.S. Cl.
CPC ............. *G06F 21/6218* (2013.01); *H04L 9/08* (2013.01); *H04L 63/062* (2013.01); *H04L 63/065* (2013.01); *H04L 63/068* (2013.01); *H04W 12/08* (2013.01); *H04L 63/102* (2013.01); *H04L 2209/60* (2013.01)

(58) Field of Classification Search
CPC ............................ H04L 12/588; H04L 51/32
See application file for complete search history.

(56) References Cited

U.S. PATENT DOCUMENTS

2007/0192830 A1    8/2007  O'Connor
2012/0203832 A1*   8/2012  Vastardis ........... G06Q 30/0241
                                              709/204

FOREIGN PATENT DOCUMENTS

CN      101442403      5/2009
JP      201239244      2/2012
(Continued)

OTHER PUBLICATIONS

TruBeRepec: a trusted-behavior-based reputation and recommender system for mobile applications. Yan et al. Pers Ubiquit Comput(2012).*

(Continued)

*Primary Examiner* — Venkat Perungavoor
(74) *Attorney, Agent, or Firm* — Mintz Levin Cohn Ferris Glovsky and Popeo, P.C.

(57) ABSTRACT

An approach is provided for controlling access to social networking data for each of a plurality of members by issuing one or more first keys for at least one of data encryption or data decryption, based on a respective current trust level associated with a corresponding member and one or more context attributes corresponding to the social networking data. The one or more first keys expire at an expiration time determined with reference to a time clock. Based on a signal accepted from the time clock, one or more second keys for at least one of data encryption or data decryption are issued to one or more members of the plurality of members who are associated with a trust level above a predetermined threshold and/or who satisfy specified context attributes, prior to the expiration time of the first keys.

17 Claims, 4 Drawing Sheets

(56) References Cited

FOREIGN PATENT DOCUMENTS

| WO | WO-2008/082597 A2 | 7/2008 |
|---|---|---|
| WO | 2011073894 | 6/2011 |

OTHER PUBLICATIONS

AdChatRep : A Reputation System for MANET Chatting. Yan et al. ACM(2011).*

A Methodology towards USable Trust Management. Yan et al. LNCS(2009).*

International Search Report received for corresponding Patent Cooperation Treaty Application No. PCT/CN2012/071982, dated Dec. 13, 2012, 3 pages.

Randy Baden et al: "Persona",Proceedings of the ACM Sigcomm 2009 Conference on Data Communication, Sigcomm '09, vol. 21, Aug. 17, 2009, p. 135. New York, New York, USA.

S.Roy et al.:"Secure Data Retrieval Based on Ciphertext Policy Attribute-Based Encryption (CP-ABE) System for the DTNs",May 31, 2009, pp. 1-11, Lehigh University, Bethlehem, PA, USA.

Nanxi Chen et al. "Secure, Selective Group Broadcast in Vehicular Networks Using Dynamic Attribute Based Encryption", Ad Hoc Networking Workshop (Med-Hoc-Net), 2010 the 9th Ifip Annual Mediterranean, Jun. 30, 2010, pp. 1-8, Piscataway, NJ, USA.

Stuedi, P., Riva, 0., and Alonso, G. "Demo Abstract—Ad Hoc Social Networking Using MAND". Downloaded Dec. 31, 2015.

A. Ahtiainen, K. Kalliojarvi, M. Kasslin, K. Leppanen, A. Richter, P. Ruuska, and C. Wijting. "Awareness Networking in Wireless Environments: Means of Exchanging Information". IEEE Vehicular Technology Magazine, Sep. 2009.

J. Bethencourt, A. Sahai, and B. Waters."Ciphertext-Policy Attribute Based Encryption", Proceedings of the 2007 IEEE Symposium on Security and Privacy. 2007, pp. 321-334.

G.Wang, Q. Liu, and J.Wu. "Hierarchical Attribute-Based Encryption for Fine-Grained Access Control in Cloud Storage Services", Proceedings of the 17th ACM Conference on Computer and Communications Security 2010, pp. 735-737.

* cited by examiner

| Key | Description | Usage |
|---|---|---|
| PK | Global key | Input for all operations |
| MK | Master key | Creation of user keys |
| SK_(a,c) | A secret key of TS w.r.t. attributes attached to an instant community c | Creation of attribute keys |
| PK_A | Public key of attribute A | Encryption (of IC communication data) |
| SK_(A,u) | Secret key of attribute A for user u | Decryption (of IC communication data) |
| PK_u | Public key of user u | Unique ID of user and key for verification of the user's attributes, personalized secret attribute keys generation |
| SK_u | Secret key of user u | Decryption (of personalized secret attribute keys) |

FIG. 3

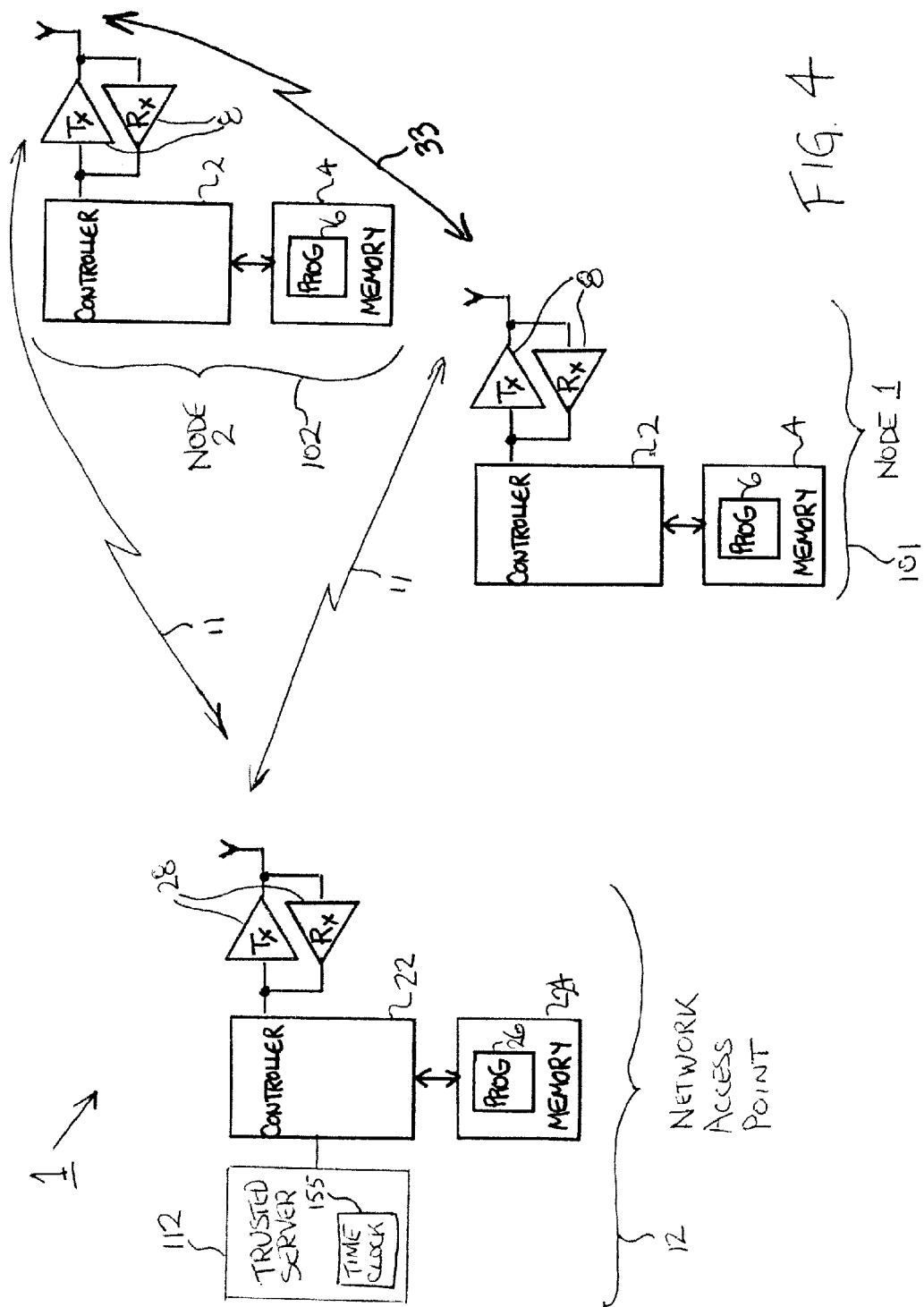

METHODS, APPARATUSES, AND COMPUTER-READABLE STORAGE MEDIA FOR SECURELY ACCESSING SOCIAL NETWORKING DATA

RELATED APPLICATION

This application was originally filed as PCT Application No. PCT/CN2012/071982 filed Mar. 6, 2012.

TECHNICAL FIELD

This invention relates generally to wireless communications and, more specifically, to methods, apparatuses, and computer readable storage media for securely accessing social networking data based upon trust levels, contexts, and a time clock.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

A Mobile Ad Hoc Network (MANET) is a collection of autonomous nodes or terminals that communicate with each other by forming a multi-hop radio network and maintaining connectivity in a decentralized manner. Each node or terminal functions as both a host and a router. The network topology is typically dynamic, because the connectivity among the nodes may vary with time due to node departures, new node arrivals, and the possibility of deploying mobile nodes.

SOME EXAMPLE EMBODIMENTS

According to one embodiment, a method controls access to social networking data for each of a plurality of members by issuing one or more first keys for at least one of data encryption or data decryption, based on a respective current trust level associated with a corresponding member and one or more context attributes corresponding to the social networking data. The one or more first keys expire at an expiration time determined with reference to a time clock. Based on a signal accepted from the time clock, one or more second keys for at least one of data encryption or data decryption are issued to one or more members of the plurality of members who are associated with a trust level above a predetermined threshold, and/or who satisfy one or more specified context attributes, prior to the expiration time of the first keys.

According to another embodiment, an apparatus comprises at least one processor, and at least one memory including computer program code for one or more computer programs, the at least one memory and the computer program code configured to, with the at least one processor, cause, at least in part, the apparatus to control access to social networking data for each of a plurality of members by issuing one or more first keys for at least one of data encryption or data decryption, based on a respective current trust level associated with a corresponding member and one or more context attributes corresponding to the social networking data. The one or more first keys expire at an expiration time determined with reference to a time clock. Based on a signal accepted from the time clock, one or more second keys for at least one of data encryption or data decryption are issued to one or more members of the plurality of members who are associated with a trust level above a predetermined threshold, and/or who satisfy one or more specified context attributes, prior to the expiration time of the first keys.

According to another embodiment, a computer-readable storage medium carries one or more sequences of one or more instructions which, when executed by one or more processors, cause, at least in part, an apparatus to control access to social networking data for each of a plurality of members by issuing one or more first keys for at least one of data encryption or data decryption, based on a respective current trust level associated with a corresponding member and one or more context attributes corresponding to the social networking data. The one or more first keys expire at an expiration time determined with reference to a time clock. Based on a signal accepted from the time clock, one or more second keys for at least one of data encryption or data decryption are issued to one or more members of the plurality of members who are associated with a trust level above a predetermined threshold, and/or who satisfy one or more specified context attributes, prior to the expiration time of the first keys.

According to another embodiment, an apparatus comprises means for processing and/or facilitating a processing of controlling access to social networking data for each of a plurality of members by issuing one or more first keys for at least one of data encryption or data decryption, based on a respective current trust level associated with a corresponding member and one or more context attributes corresponding to the social networking data. The one or more first keys expire at an expiration time determined with reference to a time clock. Based on a signal accepted from the time clock, one or more second keys for at least one of data encryption or data decryption are issued to one or more members of the plurality of members who are associated with a trust level above a predetermined threshold, and/or who satisfy one or more specified context attributes, prior to the expiration time of the first keys.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various exemplary embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides. For various example embodiments, the following is applicable: An apparatus comprising means for performing the method of any of originally filed claims 1-11.

Still other aspects, features, technical effects, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

In the attached Figures:

FIG. 3 is a data structure diagram showing a set of illustrative security keys according to an exemplary embodiment of the invention.

FIG. 4 is hardware block diagram setting forth an illustrative example of a wireless communication system that can benefit from the use of this invention.

DESCRIPTION OF SOME EMBODIMENTS

Figure 1:
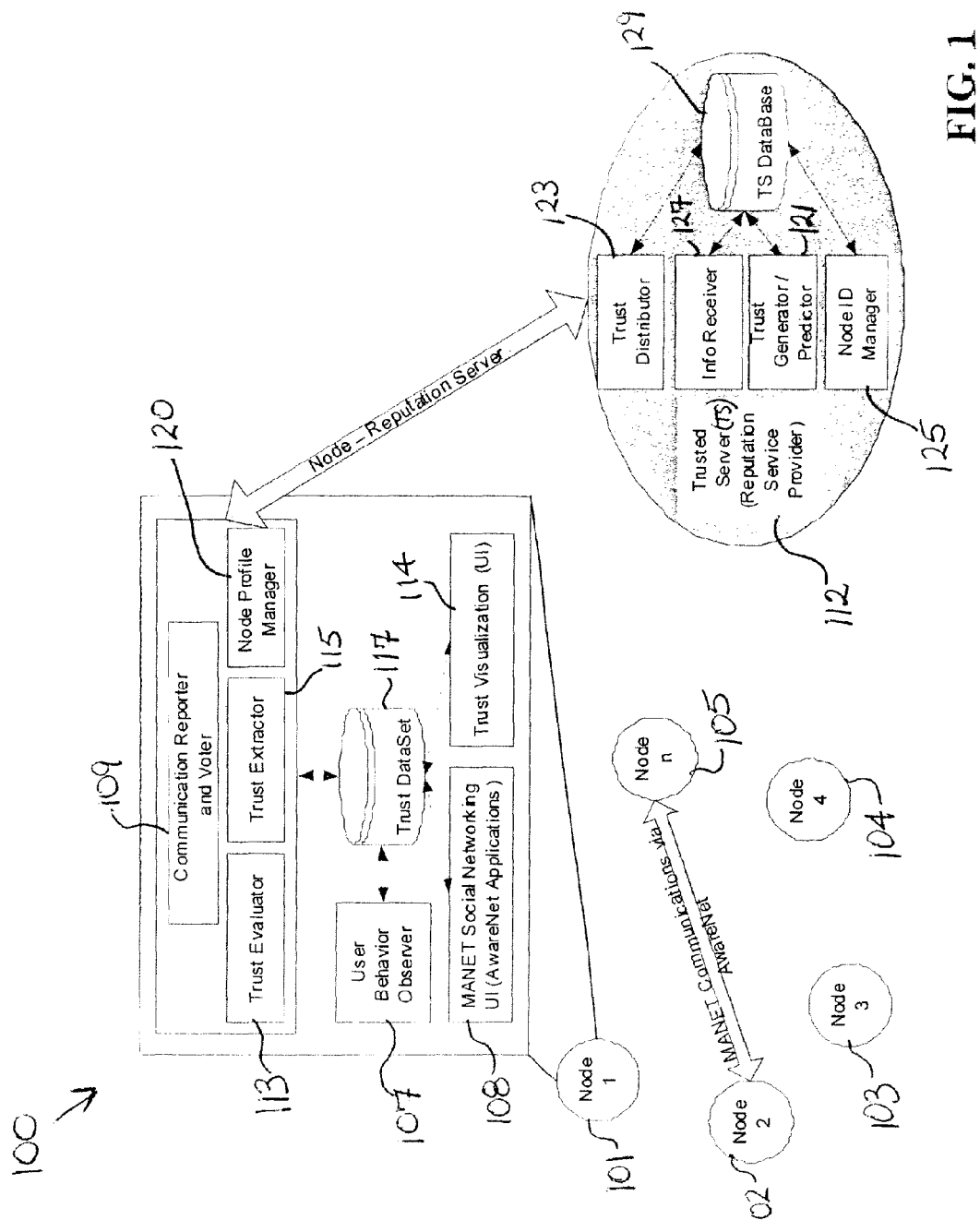
FIG. 1 is a hardware block diagram setting forth an illustrative hybrid trust management system according to an exemplary embodiment of the invention.

Examples of a method, apparatus, and computer program product for securely accessing social networking data based upon any of trust levels, contexts, and a time clock are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Access to social networking data is controlled for each of a plurality of members by issuing one or more first keys for data encryption, data decryption, or data encryption and decryption, based on a respective current trust level associated with a corresponding member and one or more context attributes corresponding to the social networking data. The one or more first keys expire at an expiration time determined with reference to a time clock. Based on a signal accepted from the time clock, one or more second keys for data encryption, data decryption, or data encryption and decryption are issued to one or more members of the plurality of members who are associated with a trust level above a predetermined threshold, and/or who satisfy one or more specified context attributes, prior to the expiration time of the first keys.

The expiration time can be set based on, for example, a respective desired security level that is specified for each of a plurality of corresponding types or categories of social networking data. In addition to or in lieu of an expiration time, a validity period may be defined for the one or more first keys. The data may comprise a communication message, wherein access to the data is controlled by context attributes. The attributes may comprise any of a geographic location identifier, a communication interest group identifier, or a local environment identifier, any of which may be detected and verified by a trusted server. A respective one or more keys for a corresponding attribute is generated to control access to the data. Optionally, other conditions of data access control can be flexibly introduced under the same attribute-related key scheme to support additional specific features. A member's current trust level may be determined with reference to the member's past social behavior in connection with social networking activities.

Each of a plurality of respective contexts may be associated with a corresponding validity period. The validity period may be determined as a function of a desired security level, wherein the more security that should be applied to a given context, the shorter the valid period will be. Social networking messages may be shared among members by means of encrypted data. The encrypted data can be decrypted only by those members with valid keys within the specified validity period. At the time of key expiration, a new set of encryption keys are issued to all members, but a new set of personalized decryption keys (i.e., secret attribute keys) are issued only to those members who satisfy a set of attribute conditions based on a newly evaluated trust level and, optionally, also based on context verification. The new set of encryption keys and the new set of personalized decryption keys are applied after the former keys expire and the new keys start to be valid. A first member can send a message to a second member so long as the second member is associated with at least a minimum level of trust. Members that are associated with a level of trust below the minimum level of trust, or who do not satisfy one or more context conditions, are not able to access messages sent by other members.

At present, MANET is a platform that appears to be well suited for providing substantially instantaneous, electronically-based social networking. For example, a user may chat with strangers nearby for the purpose of sharing a taxi ride, sharing the cost of on sale products, or chatting. Likewise, the user may solicit suggestions or recommendations from people nearby for a good purchase or a competent tour guide. This type of pervasive social networking is an essential component of Internet-based social networks, and thus is very valuable for mobile users, especially when fixed networks (e.g., Internet) or mobile networks are temporarily unavailable or costly due to access charges. Using the MANET platform for social networking also provides enhanced techniques for preserving user privacy that are more advanced than privacy schemes used by traditional social networking systems.

Trust plays an important role in social networking. It helps people to overcome a fear of potentially unknown risks, thereby encouraging individuals to engage in trust-related behaviors. As used herein, the term "trust" is a measure derived from direct or indirect knowledge and experience of earlier interactions among entities. Accordingly, trust may be used to assess the level of belief and dependence that an entity is accorded. For example, a trust value/level may be generated or assigned to each of a plurality of social networking participants.

In MANET based pervasive social networking, one illustrative social scenario is a group of people who hold similar interests linked together via wireless communication links for instant community communications. In such a situation, various people could join an open community and enter into discussions with one another. In order to avoid malicious eavesdropping, it is important to provide security for the instant community communications. For proprietary or sensitive discussions, it is important to be able to set up a secure communication channel among trustworthy members. It may also be important to control social communication data access based on the trust value/level.

For many types of instant community communication, (e.g., a request for, or an offer of, a car ride to a specified location after a football game), it may be desirable to ensure that the communication (e.g., how to share a taxi fee, where to go, etc.). is private and secure. Thus, one or more of the following security issues may need to be addressed: a) non-community members should not be able to read or to access the community communication data; b) there should be a way to exclude community members having low trust values/levels from the community discussion or from seeing crucial talking contents.

Encryption keys represent one possible technique for securing community communication data. Due to the dynamic changes of community topology (new members joining and old members leaving), and the potentially frequent changes of each participant's trust level, the encryption key used for securing community communication may need to be frequently changed. This frequent changing requires the decryption keys to be distributed to each of the eligible community members. This redistribution introduces a heavy traffic and processing load, which may cause a serious performance bottleneck. How to automatically control instant community data access in a secure and efficient way is a challenge.

Traditional centralized social networking systems such as Facebook™ have not taken instant community data protection into account. They cannot support instant social networking in an efficient and economic way, especially when users do not have an Internet connection. Several research groups have focused on social networking activities based on mobile ad-hoc networks. The Stanford MobiSocial™ Group has developed Junction™, a mobile ad hoc and multiparty platform for MANET applications. Refer, for example, to Harvard MobiSocial™ Group at http://open-junction.org. Likewise, Micro-Blog™ was developed by SyNRG™ in Duke University and helps users to post micro-blogs tagged by locations and viewed by others (see http://synrg.ee.duke.edu/microblog.html). AdSocial™, described in *Demo Abstract—Ad Hoc Social Networking Using MAND*, by Stuedi, P., Riva, O., and Alonso, G., available at http://www.iks.inf.ethz.ch/publications/files/mobicom08_demo.pdf and introduced by ETHz Systems Group™, also aims to provide a pervasive social communication platform. Instant community scenarios are discussed in *Awareness Networking in Wireless Environments: Means of Exchanging Information*, by A. Ahtiainen, K. Kalliojarvi, M. Kasslin, K. Leppanen, A. Richter, P. Ruuska, and C. Wijting, IEEE Vehicular Technology Magazine, September 2009.

Trust and reputation aspects in social networking are not considered in any of the previously-cited research projects. Advogato (http://www.advogato.org/) is an online service to provide a platform for free software developers to advocate software and promote research. One significant impact of Advogato is its trust metrics behind the service, which is the basis of many research projects (http://www.advogato.org/trust-metric.html). Advogato trust metric stimulates users to contribute quality ensured software and protects against attacks. However, Advogato only applies a centralized architecture for reputation generation and does not deal with the issue of how to control access to data based on reputation level.

Access control on encrypted data means that the encrypted data can only be decrypted by users with permissions. The ideal approach is to encrypt each data once, and distribute appropriate keys to users once, so that each user can only decrypt his authorized data. As mentioned previously, due to possibly frequent member changes and trust level changes, the decryption key should be frequently changed in order to achieve an expected security level.

Attribute-based encryption (ABE) is a new cryptographic technique that is described, for example, in *Ciphertext-Policy Attribute Based Encryption* by J. Bethencourt, A. Sahai, and B. Waters, Proceedings of the 2007 IEEE Symposium on Security and Privacy, 2007, pp. 321-334. Pursuant to the ABE system, users are identified by a set of attributes rather than an exact identity. Each data is encrypted with an attribute-based access structure, such that only the users whose attributes satisfy the access structure can decrypt the data. For example, for data D, encrypted with the access structure comprising a1 or a2, users with either attribute a1 or attribute a2, can decrypt D. Recently ABE has been widely applied in secure data storage for cloud computing as discussed in *Hierarchical Attribute-Based Encryption for Fine-Grained Access Control in Cloud Storage Services*, G. Wang, Q. Liu, and J. Wu, Proceedings of the 17th ACM Conference on Computer and Communications Security 2010, pp. 735-737.

User revocation means that the data owner withdraws access rights from users who no longer belong to a group or due to other reasons, e.g., the user is not trustworthy enough. Unfortunately, since the revoked users still retain the keys issued earlier, they can still decrypt data. The data owner needs to encrypt its data with new keys, so that the revoked users cannot decrypt the recent data any more using their old keys, and then redistribute the new keys to the remaining authorized users, so that only authorized users can still access the data.

Existing key management solutions in the context of instant community social networking are ineffective because they provide no mechanism for applying a trust level including user and context attributes as control conditions of data access. Moreover, these key management solutions fail to consider situations where it may be desirable to change a particular user's ability to access data without affecting other users.

Either a distributed or a centralized reputation architecture, or both, may be used to implement the methods described herein. Each type of architecture presents unique advantages and disadvantages. FIG. 1 is a hardware block diagram setting forth an illustrative hybrid trust management system 100 according to an exemplary embodiment of the invention. The system is hybrid because it utilizes elements of a centralized reputation architecture as well as elements of a distributed reputation architecture. For each of a plurality of nodes such as node 1 101, node 2 102, node 3 103, node 4 104 and node N 105, a User Behavior Observer 107 records node social behaviors. A Mobile Ad Hoc Network (MANET) Social Networking User Interface (UI) 108 provides a user interface that enables two or more of the nodes 101-105 to engage in social networking. The UI 108 may comprise, for example, one or more pervasive social networking applications such as TWIN™, GhostTalk™, Facebook™, and/or Linkedin™.

A Communication Reporter and Voter 109 reports communication records and local trust information to a Trusted Server (TS) 112. Meanwhile, from any of the nodes 101-105, the user can vote other entities through it to the TS 112. A Trust Evaluator 113 evaluates a node user's local trust level and provides the results to the user via a Trust Visualization UI 114. A Trust Extractor 115 receives one or more trust tokens (containing a node user's general trust value, public and personalized secret keys for one or more attributes, and a valid time period for the keys, etc.) issued by the TS 112. A Trust DataSet 117 stores all data related to the above functional blocks for each of the Nodes 101-105 in a secure manner. In addition, a Node Profile Manager 120 is used to maintain a node user's personal information. The Node Profile Manager 120 can communicate with the TS 112 to register a node (such as any of nodes 101-105) into the trust management system 100 and update the node user's pseudonym and trust token.

At the TS 112, a Trust Generator/Predictor 121 calculates a node trust value for each of one or more nodes such as nodes 101-105. The Trust Generator/Predictor 121 also identifies malicious nodes which are nodes that are being used by untrustworthy users. A Trust Distributor 123 distributes the trust tokens to each node 101-105 periodically or repeatedly. A Node ID Manager 125 handles node registration and community registration and issues new node pseudonyms (by request or periodically). An Information Receiver 127 collects any records reported by the nodes 101-105 and saves them into a TS DataBase 129, which also saves the trust token of each of the nodes 101-105 as well as a real ID for the nodes 101-105 and any pseudonyms for the nodes 101-105.

The nodes 101-105 may be equipped to communicate with one another based on one or more groups. The node is such kind of things as devices or processors or elements or sensors, etc. They can communicate with each other based on groups, the data access and protection can apply the invention, where the things can connect to Internet to report what they have collected.

FIG. 3 is a data structure diagram showing a set of illustrative security keys according to an exemplary embodiment of the invention. During setup of the trust management system 100 (FIG. 1), a public master key PK 301 (FIG. 3) and a secret master key MK 303 are generated. The PK 301 is available to every member or participant (i.e., node user) in the trust management system 100 (FIG. 1), whereas the MK 303 (FIG. 3) is only known to the TS 112 (FIG. 1). Every node user u maintains a public user key PK_u 305 (FIG. 3), which is used by the TS 112 (FIG. 1) to generate personalized secret attribute keys, and a secret key SK_u 307 (FIG. 3), which is used in a decryption operation related to PK_u 305. Generation and distribution of PK_u 305 and SK_u 307 is the task of the TS 112 (FIG. 1), which is also required to verify the unique identity of each of the node users before these two keys are generated and issued during user registration into the trust management system 100. The keys SK_u 307 (FIG. 3) and PK_u 305 of a user u are bound to the unique identity of the user by the TS 112 (FIG. 1). This binding is crucial for the verification of the node user's attributes.

The TS 112 (FIG. 1) maintains a secret key SK_(a,c) 309 for each community c, which is used to issue secret attribute keys to node users. An attribute comprises an identifier describing the attribute itself, wherein the identifier may, but need not, be present in the form of an arbitrary string. In this case, there are at least two different types of attributes. A first type of attribute is a 'trust level' attribute, and a second type of attribute is a 'context' attribute. A public representation of an attribute will be denoted as A.

For every attribute with a representation of A, there is a public key, denoted as PK_A 311 (FIG. 3), which is issued by the TS 112 (FIG. 1) and is used to encrypt social networking data comprising one or more messages. The one or more messages are received by one or more nodes 101-105 in the trust management system 100 (FIG. 1). The trust management system 100 may be conceptualized as supporting an instant community (IC) for performing social networking. A set of corresponding secret attribute keys, personalized for each of one or more eligible node users, are issued by the TS 112 to the eligible node users. To prevent collisions, every node user is assigned a different secret attribute key that only he or she can use. A secret attribute key of an attribute A, issued for a user u is denoted by SK_(A,u) 309. The set of secret keys that a given user is assigned (i.e., the key SK_u 307 and all keys SK_(A,u) 309) are termed a key ring.

Six exemplary algorithms may be used in connection with the keys shown in FIG. 3: These algorithms are a Setup algorithm, an InitiateUser (PK, MK, u) algorithm, an IssueAttribute (PK, A, SK_(a,c)) algorithm, an IssueAttribute (PK, A, SK_(a,c), u, PK_u) algorithm, an Encrypt algorithm, and a Decrypt algorithm. The description of the six algorithms is as follows.

The Setup algorithm takes as input an implicit security parameter $1^k$. The Setup algorithm outputs the public key PK 301 and the master key MK 303. The Setup algorithm also generates a secret key SK_(a,c) 313 for the purpose of attributes related access control operations within an instant community c. at the TS 112 (FIG. 1). The foregoing operation could be conducted at the TS 112. The output of the Setup algorithm is SK_(a,c) 313, PK 301, and MK 303 (FIG. 3). Note that SK_(a,c) can be generated at the time when a community is generated.

The InitiateUser (PK, MK, u) algorithm takes as input the public key PK 301, the master key MK 303, and a node user identity u. This algorithm outputs the public user key PK_u 305, that will be used by the TS 112 (FIG. 1) to issue secret attribute keys for u, and the secret user key SK_u 307 (FIG. 3), used for the decryption of ciphertexts. This operation is also conducted at the TS 112 (FIG. 1) when the node user registers into the system. The outputs of this algorithm are PK_u 305 and SK_u 307 (FIG. 3).

The IssueAttributePK (PK, A, SK_(a,c)) algorithm is automatically executed by the TS 112 (FIG. 1) whenever it is time to issue a public attribute key by checking the valid period of previous issuing for c. The algorithm checks the attribute and its related policies. If a public attribute key is to be issued, the algorithm outputs a public attribute key for attribute A, denoted PK_A 311 (FIG. 3), otherwise the algorithm outputs a NULL value. This operation is executed at the TS 112 (FIG. 1) automatically based on a time clock within the trust management system 100 and the valid period of a presently existing or previously used key.

The IssueAttributeSK (PK, A, SK_(a,c), u, PK_u) algorithm is automatically executed by the TS 112 whenever it is time to issue a secret attribute key by checking the valid period of previous issuing for c. The algorithm checks whether the user u with public key PK_u 305 (FIG. 3) is eligible of the attribute A (i.e., the user u's trust level is equal or above an indicated or specified threshold level). If this is the case, IssueAttributeSK outputs a secret attribute key SK_(A,u) 309 for user u. Otherwise, the algorithm outputs NULL. This operation is executed at the TS 112 (FIG. 1) automatically based on the time clock and the valid period of a previous key issue. For example, a user's trust value can be specified as any one of five different levels, from 1 to 5, with 5 representing the highest trust. If a user's trust level TL_u is 5, it is reasonable for the TS 112 to issue three SK_(A,u) 309 keys to this user, attaching to three possible policies, respectively: A1: TL_u>=3; A2: TL_u>=4; A3: TL_u>=5.

If a node user location L_u is considered in providing secure data access, then one illustrative attribute in policy A can be A4: L_u within a scope or range of values (longitude1, latitude1, longitude2, latitude 2). If L_u is detected within that scope or range of values, the TS 112 (FIG. 1) will issue a corresponding SK_(A,u) 309 (FIG. 3) to this user with regard to the location attribute for data access. In this example, the node user u may obtain 4 secret attribute keys: SK_(A1,u), SK_(A2,u), SK_(A3,u), SK_(A4,u).

The Encrypt(PK, M, A, PK_A1, . . . , PK_AN) algorithm takes as input the public key PK 301, an IC communication message M, an access policy A and the public keys PK_A1, . . . , PK_AN corresponding to all attributes occurring in the policy A. The algorithm encrypts M with the policy A and outputs the ciphertext CT. This process is conducted at a user node such as any of nodes 101-105 (FIG. 1) to protect the node's IC communication message. For example, the user of node 2 would like other IC members with trust level over 4 and in the location within a shopping mall (longitude1, latitude1, longitude2, latitude 2) to access his data. The node 2 encrypts the user's message with policy A2: TL_u>=4, and A4: L_u within a scope (longitude1, latitude1, longitude2, latitude 2). Node 2 102 uses Encrypt(PK, M, A, PK_A2, PK_A4) to encrypt the message.

Note that a policy may be described in Disjunctive Normal Form (DNF). The policy in DNF can be written as $$AA = \bigvee_{j=1}^{n} \left( \bigwedge_{A \in S_j} A \right)$$

where n (not pairwise disjoint) sets S1, . . . , Sn denote attributes that occur in the j-th conjunction of AA. The encryption algorithm iterates over all j=1, . . . , n, generates for each conjunction a random value R_j and constructs CT_j corresponding to each Sj. The ciphertext CT is obtained as a tuple CT:=<CT1, CT2, . . . , CTn>

The Decrypt(PK, CT, A, SK_u, SK_(A1,u), . . . , SK_(AN,u)) algorithm takes as input a ciphertext produced by the Encrypt algorithm, an access policy A, under which CT was encrypted, and a key ring SK_u, SK_(A1,u), . . . , SK_(AN,u) for user u. The algorithm Decrypt decrypts the ciphertext CT and outputs the corresponding plaintext M if the attributes were sufficient to satisfy A; otherwise it outputs NULL. This process is executed when an IC member or node user receives an IC message. The algorithm firstly checks the encryption policy A, then conducts decryption with the key rings issued by the TS 112 (FIG. 1).

Following the above example, an IC member or node user is in a shopping mall. The user is associated with a trust level of 5. Based on a received policy A, the user uses Decrypt (PK, CT, A, SK_u, SK_(A2,u), SK_(A4,u)) to decrypt the message.

Figure 2:
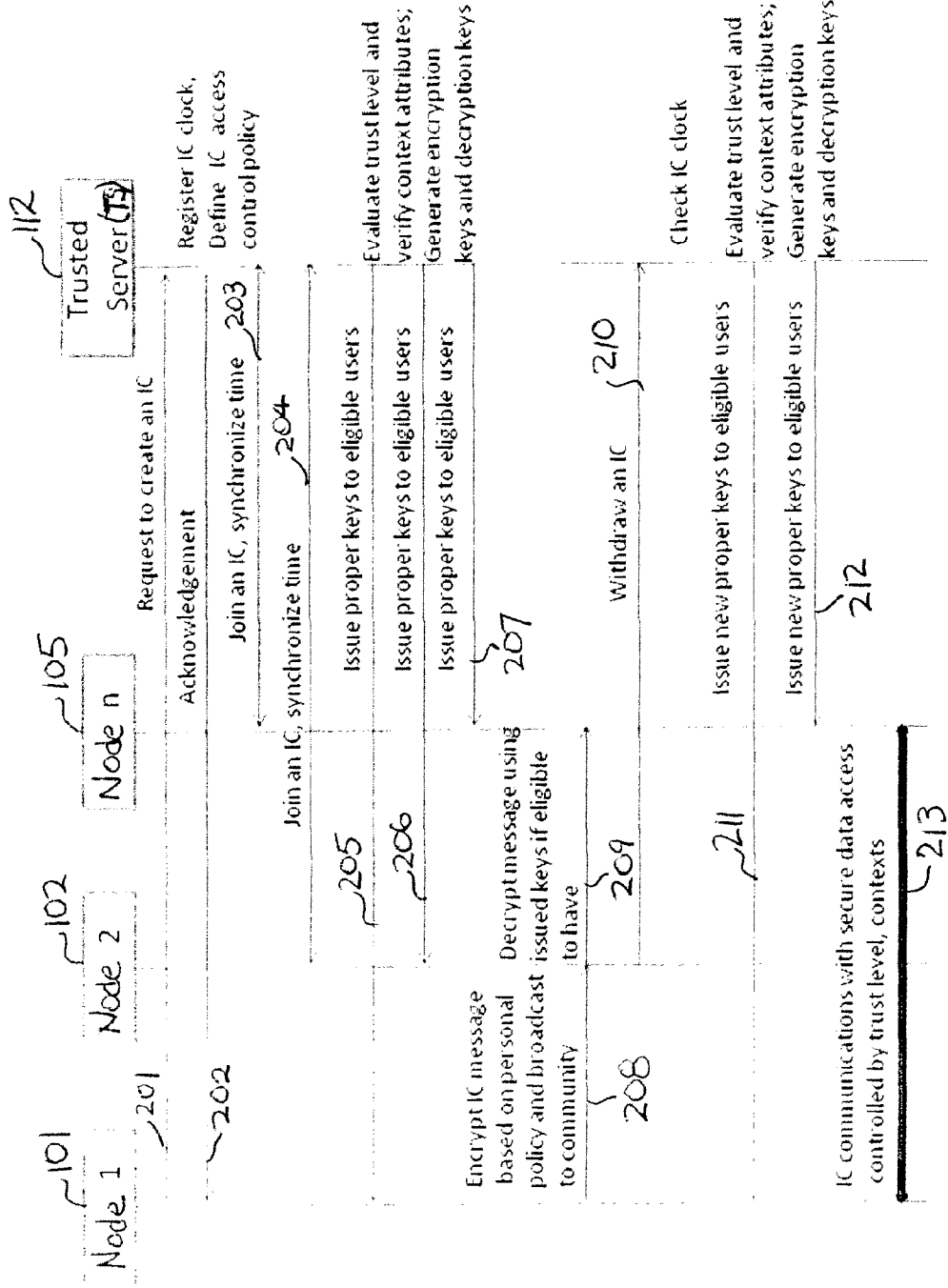
FIG. 2 is an information flow diagram setting forth an illustrative operational sequence for securely accessing social networking data based upon trust levels, contexts, and a time clock according to the instant invention.

FIG. 2 is an information flow diagram setting forth an illustrative operational sequence for securely accessing social networking data based upon trust levels, contexts, and a time clock according to the instant invention. The operational sequence commences at step 201 where a request to create an instant community (IC) is sent by node 1 101 and received at trusted server (TS) 112. The TS 112 responds to the request by sending an acknowledgment to node 1 101 at step 202. The TS 112 generates the IC by registering an IC time clock and defining an IC access control policy. The IC control policy may be defined by the TS 112, or a user at node 1 101, or both.

At step 203. node n 105 requests to join the IC. The TS 112 responds to the request from Node n 105 by obtaining a synchronized IC time from the registered IC clock and sending the synchronized IC time to node n 105. Similarly, at step 204, node 2 102 requests to join the IC. The TS 112 responds to the request from node 2 102 by obtaining a synchronized IC time from the registered IC clock and sending the synchronized IC time to node 2 102.

One or more keys are issued at steps 205, 206 and 207. More specifically, the TS 112 evaluates the trust levels of one or more users at any of node 1 101, node 2 102, or node n 105. These users comprise IC members. The TS 112 verifies one or more context attributes for these one or more users. The TS 112 generates encryption public keys and personalized decryption secret keys of attributes, and then issues the proper keys (both public encryption keys and personalized decryption keys) to eligible users at one or more nodes such as node 1 101 node 2 102, or node n 105. At step 208, secure IC communications are provided. A node, such as node 1 101, encrypts a message that was input by a user based on personal access policies using a set of corresponding public keys PK_Ai.

The encrypted message is received by the TA 112 and broadcast to other nodes, such as node 2 102 and node n 105, where node 2 102 and node n 105 are nodes used by other IC members. Alternatively or additionally, the encrypted message may be broadcast by node 1 101 to node 2 102 and node n 105 without having to go through the TS 112. At step 209, the other nodes used by the other IC members (node 2 102 and node n 105) perform a check of an encryption policy A. Note that the encryption policy A is provided by a message sender at node 1 101. Node 2 102 and node n 105 each then use their personalized decryption keys to decrypt the encrypted message if the node is eligible to access the message.

At step 210, one or more member may quit from the IC at any time by entering a withdrawal request into a node such as node 2 102. Node 2 102 then sends the withdrawal request to the TS 112. The TS 112 confirms the withdrawal request by not sending any new keys to node 2 102 after his current keys have expired. At step 211, new keys are issued. The TS 112 check the IC clock on a repeated or periodic or frequent basis. If the validity period of the current keys is close to expiration, the TS 112 will evaluate the trust level and verify context attributes. Based upon the trust level evaluation and the context attributes being successfully verified, at step 212 the TS 112 will then generate encryption public keys and personalized decryption secret keys, set a validity period for the public keys and personalized decryption secret keys, and re-issue the new public keys and personalized decryption secret keys to one or more eligible users at one or more nodes such as node 1 101 and node n 105. At step 213, the IC members at node 1 101 and node n 105 continue secure communications with the new keys generated at step 212 when the validity period of the new keys commences.

The operational sequence of FIG. 2 provides a method of securely accessing social networking data based upon trust levels, contexts, and a time clock. The method is flexible in the sense that new or changing access conditions may be introduced in the policy by which instant community communications is secured. Moreover, it is possible to add additional access control conditions, e.g., related to context, community activity and other attributes. The only requirement is that the TS 112 be capable of verifying that, if an IC member satisfies those conditions, thus the TS 112 will issue corresponding SK_(A,u) to the eligible member. The method of FIG. 2 supports various pervasive social networking activities (e.g., chatting, recommending, etc.) that need trust management support. SK_(A,u) is linked to the member's community c that could support different activities. For different communities and for different activities, the TS 112 can generate different SK_(A,u), thereby enlarging the applicability of the system.

The keys issued by the TS 112 are based on the community time clock registered at the TS 112 at step 201. The time clock is synchronized when new member joins the community as discussed previously with reference to step 203. At or prior to the time at which a key expires, the TS 112 will re-evaluate the trust level of IC members (steps 205-207) and verify other policy attributes in order to issue new keys automatically without request. Thus the method of FIG. 2 greatly reduces the transmission load needed in other solutions that issue new keys in response to requests received from users.

The method of FIG. 2 provides security in accordance with attribution-based encryption theory. Optionally, security is further enhanced using fine-grained encryption mechanisms controlled by the time clock. New encryption keys will be generated prior to expiration of a specified validity time. The TS 112 may also be equipped to handle ambiguous or confusing situations that may arise in the context of IC communication. For example, a user at node 1 101 can request the TS 112 to decrypt a message if the new key ring is not received. The TS 112 may determine the validity period of one or more of the keys according to the security expectation of a community, e.g., the crucial level of community activities. Node 1 101, node 2 102 and node n 105 are programmed to ensure that new keys are employed when the validity time of the new keys commence. Even though nodes used by some members may not have received the encryption keys, other members can share encryption keys with these members, e.g., based on a node-to-node secure communication. In the case that a member leaves the community, such a member cannot access community data after new keys are issued. This means that an IC withdraw request (step 211) is automatically processed at the time when the new keys are issued.

FIG. 4 is hardware block diagram setting forth an illustrative example of a wireless communication system 1 that can benefit from the use of this invention. The system 1 comprises a plurality of apparatuses which may be referred to without a loss of generality as client devices or stations or UEs or nodes, such as a node 1 101 (FIGS. 1, 2, and 4) and a node 2 102 (FIGS. 1, 2, and 4). Referring now to FIG. 4, the system 1 further comprises another apparatus which may be referred to without a loss of generality as a base station or a Node B or an enhanced Node B (eNB) or a network access point 12 that communicates via wireless radio frequency (RF) links 11 with node 1 101 and node 2 102. While two nodes 101, 102 are shown, in practice, there could be tens or hundreds of nodes that are served by a cell or cells established by the network access point 12. Illustratively, the network access point 12 is configured to implement a trusted server (TS) 112, or the network access point 12 provides access to the TS 112. The TS 112 comprises a time clock 155, or the TS 112 accepts an input from a time clock 155.

Each node, such as node 1 101 and node 2 102, comprises a controller 2, such as at least one computer or a data processor, at least one non-transitory computer-readable memory medium embodied as a memory 4 that stores a program of computer instructions (PROG) 6, and at least one suitable RF transmitter (Tx) and receiver (Rx) pair (transceiver) 8 for bidirectional wireless communications with the network access point 12 via antennas 28. Node 1 101 and node 2 102 are capable of communicating directly with one another over a wireless radio frequency (RF) link 33. Note that the transceiver 8 of node 1 101, as well as the transceiver 8 of node 2 102, may each be equipped for communicating with the network access point 12 over the RF link 11, and each transceiver 8 may also equipped for communicating directly with other nodes over the RF link 33. Alternatively or additionally, node 101 or node 102, or both, may be equipped with a separate transceiver (not shown) in addition to transceiver 8, wherein the separate transceiver is equipped for communicating directly with other nodes over the RF link 33.

The network access point 12 also comprises a controller 22, such as at least one computer or a data processor, at least one computer-readable memory medium embodied in a memory 24 that stores a program of computer instructions (PROG) 26, and suitable RF transceivers 28 for communication with node 1 101 and node 2 102 via antennas. The network access point 12 may be assumed to be interfaced with a core network (not shown) via an interface such as an S1 interface that provides connectivity, in the LTE system, to a mobility management entity (MME) and a serving gateway (S-GW).

At least one of the programs 6 and/or 26 is assumed to comprise program instructions that, when executed by the associated controller, enable the device to operate in accordance with the exemplary embodiments of the invention as described previously in connection with FIGS. 1-3. That is, the exemplary embodiments of the invention may be implemented at least in part by computer software executable by the controller 2 of node 1 101, and/or by the controller 2 of node 2 102, and/or by the controller 22 of the network access point 12, or by hardware, or by a combination of hardware and software (and firmware). The program 6 of node 1 101 and/or the program 6 of node 2 102 implement the Communication Reporter and Voter 109 (FIG. 1), Trust Evaluator 113, Trust Extractor 115, Node Profile Manager 120, Trust DataSet 117, User Behavior Observer 107, MANET social networking UI 108, and Trust Visualization UI 114.

The various controllers/data processors, memories, programs, transceivers and antenna arrays depicted in FIG. 4 may all be considered to represent means for performing operations and functions that implement the several non-limiting aspects and embodiments of the invention. In general, the various embodiments of node 1 101 may comprise, but are not limited to, mobile communication devices, desktop computers, portable computers, image capture devices such as digital cameras, gaming devices, music storage and playback devices, Internet devices permitting wireless Internet access and browsing, and portable units or terminals that incorporate combinations of such functions.

The computer-readable memories 4 and 24 may be of any type suitable to the local technical environment and may be implemented using any suitable data storage technology, such as semiconductor-based memory devices, random access memory, read only memory, programmable read only memory, flash memory, magnetic memory devices and systems, optical memory devices and systems, fixed memory and removable memory. The controllers 2 and 22 may be of any type suitable to the local technical environment, and may comprise one or more of general purpose computers, special purpose computers, microprocessors, digital signal processors (DSPs), and processors based on multi-core processor architectures, as non-limiting examples.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    controlling access to social networking data for each of a plurality of members by issuing one or more first keys for at least one of data encryption or data decryption, based on a respective current trust level associated with a corresponding member and one or more context attributes corresponding to the social networking data, wherein the one or more first keys expire at an expiration of a validity period, wherein a duration of the validity period is inversely proportional to a desired security level for the social networking data; and
    issuing, based on a signal accepted from the time clock and prior to the expiration of the validity period of the first keys, one or more second keys for at least one of data encryption or data decryption to one or more members of the plurality of members who are associated with a trust level above a predetermined threshold and/or who satisfy one or more specified context attributes.

2. The method of claim 1 wherein the expiration time is determined according to a respective desired security level that is specified for each of a plurality of corresponding types or categories of social networking data.

3. The method of claim 1 wherein, in addition to or in lieu of a validity period, an expiration time is defined for the one or more first keys.

4. The method of claim 3 wherein the encrypted data can be decrypted only by a member with a valid key and within a specified validity period for the valid key.

5. The method of claim 3 further comprising at the time of key expiration, issuing a new set of encryption keys to all members.

6. The method of claim 5 further comprising issuing a new set of personalized decryption keys only to one or more members who satisfy a set of attribute conditions based on a newly evaluated trust level and/or satisfy one or more specified context attributes.

7. The method of claim 1 wherein the social networking data comprises a communication message that is controlled by the one or more context attributes, and the one or more context attributes comprise any of a geographic location identifier, a communication interest group identifier, or a local environment identifier.

8. The method of claim 1 wherein a respective one or more keys for a corresponding attribute is generated to control access to the social networking data.

9. The method of claim 1 further comprising receiving one or more social networking messages from a member and sharing the received one or more messages among one or more additional members using encrypted data.

10. An apparatus comprising at least one processor and at least one memory including computer program code, the at least one memory and the computer program code configured to, with the at least one processor, cause the apparatus to at least:
    control access to social networking data for each of a plurality of members by issuing one or more first keys for at least one of data encryption or data decryption, based on a respective current trust level associated with a corresponding member and one or more context attributes corresponding to the social networking data, wherein the one or more first keys expire at an expiration of a validity period, wherein a length of the validity period is inversely proportional to a desired security level for the social networking data; and
    issue, based on a signal accepted from the time clock and prior to the expiration of the validity period of the first keys, one or more second keys for at least one of data encryption or data decryption are issued to one or more members of the plurality of members who are associated with a trust level above a predetermined threshold and/or who satisfy one or more specified context attributes.

11. The apparatus of claim 10 wherein the expiration time is determined according to a respective desired security level that is specified for each of a plurality of corresponding types or categories of social networking data.

12. The apparatus of claim 10 wherein, in addition to or in lieu of a validity period, an expiration time is defined for the one or more first keys.

13. The apparatus of claim 12 is further caused to at least issue a new set of encryption keys to all members at the time of key expiration.

14. The apparatus of claim 13 is further caused to at least issue a new set of personalized decryption keys only to one or more members who satisfy a set of attribute conditions based on at least one of a newly evaluated trust level and/or one or more specified context attributes.

15. The apparatus of claim 10 wherein the social networking data comprises a communication message that is controlled by the one or more context attributes, and the one or more context attributes comprise any of a geographic location identifier, a communication interest group identifier, or a local environment identifier.

16. The apparatus of claim 10 wherein a respective one or more keys for a corresponding attribute is generated to control access to the social networking data.

17. The apparatus of claim 10 is further caused to at least receive one or more social networking messages from a member and sharing the received one or more messages among one or more additional members using encrypted data.

\* \* \* \* \*